March 8, 1955 W. E. LARGE ET AL 2,703,860
ELECTRIC DISCHARGE APPARATUS FOR POLYPHASE MOTORS
Filed Oct. 21, 1949 3 Sheets-Sheet 1

WITNESSES:
E. A. McCloskey
Nw. C. Groome

INVENTORS
William E. Large and
Robert F. Borrell.
BY
Hymen Diamond
ATTORNEY

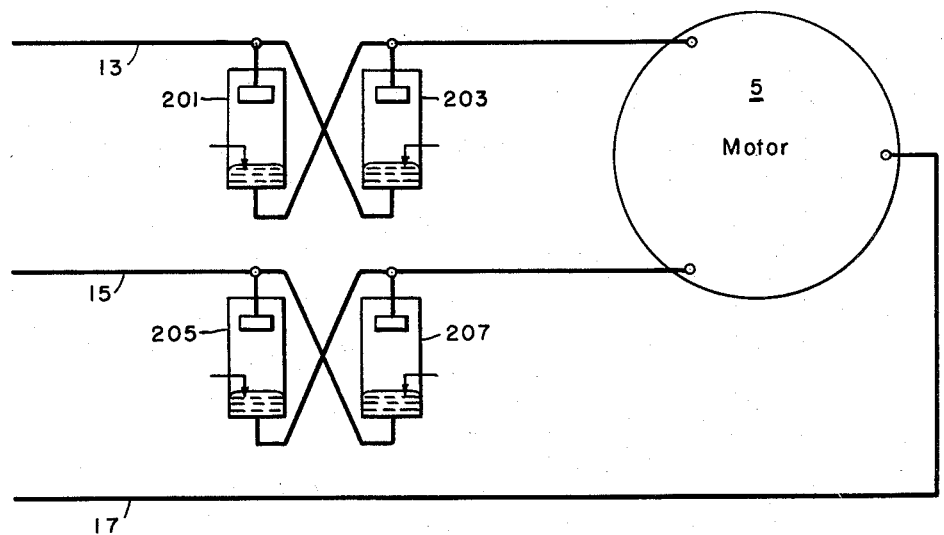

2,703,860

ELECTRIC DISCHARGE APPARATUS FOR POLYPHASE MOTORS

William E. Large, Tonawanda, and Robert F. Barrell, Buffalo, N. Y., assignors to Westinghouse Electric Corporation, East Pittsburgh, Pa., a corporation of Pennsylvania Application October 21, 1949, Serial No. 122,694

9 Claims. (Cl. 318—227)

Our invention relates to electric discharge apparatus and has particular relation to electronic motor control apparatus.

In its specific aspects our invention was conceived to provide a motor drive suitable for operating an automobile body press. In accordance with the teachings of the prior art of which we are aware, an automobile body press is driven by a low torque motor having a flywheel of high inertia on its shaft. The power from the motor system is transmitted to the press through a clutch. As the press engages the material to be formed and is disengaged from it, the clutch is repeatedly engaged and disengaged. While so operated the clutch is repeatedly subjected to impacts of large magnitude and is frequently damaged.

It has been proposed that the low-torque-motor-clutch combination be replaced by a relatively high torque motor of the polyphase type directly geared to the press mechanism. Such a high torque motor has a high current demand. Since the motor must be started and stopped each time work is formed, the control of the motor presents a serious problem.

It is, accordingly, an object of our invention to provide a motor system for driving directly the mechanism of a heavy duty press such as is utilized in the forming of automobile bodies.

A more general object of our invention is to provide a motor assembly including a high torque motor and control apparatus for repeated starting and stopping of the motor.

Another general object of our invention is to provide an assembly including a rugged motor capable of withstanding large mechanical impacts which shall have a high degree of flexibility in its operation.

An ancillary object of our invention is to provide a control system for a high torque motor which shall operate without substantial deterioration of control components.

Our invention arises from the realization that the gist of the problem of providing a motor assembly to drive a press resides in the control mechanism of the motor. Since the motor must start and stop for each operation of the press, a mechanism must be provided for repeatedly interrupting the current flow through the stator of the motor. Since the motor is of the high torque type and draws very large currents, the mechanism must be capable of conducting such currents without substantial deterioration. Mechanical contacts would not meet this requirement satisfactorily. Electronic devices, however, do interrupt current flow in a vacuum without deterioration to the current conducting elements.

In accordance with our invention, we provide a motor assembly including a polyphase motor, each phase winding of which is supplied through electric discharge valves. The valves are preferably of the mercury pool type, such as ignitrons, and two valves are interposed in anti-parallel between each terminal of a polyphase supply and a terminal of a motor winding.

The power factor of a motor of the type under consideration here changes as the motor comes up to speed. The valves are fired in such phase with relation to the pulsations of the supply as to minimize excessive currents by reason of transients taking this variation into consideration.

Certain systems in accordance with our invention include a motor the power factor of which decreases as the motor speed rises from zero to the desired magnitude. In one system which we have encountered the power factor is 40% when the motor is first started, and 17% when the motor reaches the desired speed. In such systems the control circuits for the valves are set to fire the valves so that whatever transient may arise when the motor is started is a minimum. As the motor comes up to the desired speed, the power factor gradually decreases. Because of the decrease in power factor the valves which have been conducting and are about to be extinguished continue to conduct until other valves take over. A hiatus in the conductivity of the valves is thus avoided. Under certain circumstances, particularly when the motor operates at full voltage, this hiatus is undesirable. Motor assemblies, in accordance with our invention, may also include motors, the power factor of which increases as they come up to speed. The control systems for such motors may be provided with components for advancing the instant of firing in the half-periods of the supply as the power factor of the motor increases.

The motor windings impress back electromotive forces in their associated valve circuits. These electromotive forces counteract the supply potential. At times the net potential available in the circuit of any valve may be so small that the valve may fail to fire when its firing potential is impressed. If the firing potential were derived from the supply it too may be affected by the back electromotive forces. These difficulties are overcome in accordance with our invention by providing a firing circuit for each valve which is independent of the motor voltage and by providing an auxiliary anode circuit for each valve to sustain the arc of a valve through the complete range of the motor power factor angle. The independent firing circuit supplies sufficient potential to fire the valve regardless of the back electromotive force and the auxiliary circuit produces an arc which avails the ionization for the main arc when the main anode potential reaches the proper magnitude.

The windings of the motors used in the operation of body presses are ordinarily connected in star. Under such circumstances, two windings of the motor are connected in series with each pair of phase conductors of the supply. On occasions the body press has a tendency to engage the work so firmly as not to be readily disengageable therefrom. The motor windings are then disconnected and reconnected in a polygonal configuration (delta for a three-phase motor). When the motor is connected in a polygonal configuration, each winding of the motor is connected across a pair of phase conductors of the supply. Under such circumstances the current conducted by the motor windings is substantially higher than the current conducted when the winding is connected in star. To preclude damage to the motor, we provide, in accordnace with our invention, a timing system for supplying a motor connected in a polygonal configuration intermittently at properly preselected intervals.

A motor assembly, in accordance with the preferred practice of our invention, is supplied from commercial buses of the three-phase type. Such buses are ordinarily connected in delta. When the motor windings are connected in star, a pair of electric discharge valves are interposed between each supply bus and the free terminals of the motor windings. Under such circumstances, two of the valves are conductive when current flows through the motor windings. The motor windings may be similarly supplied when they are connected in a polygonal configuration, that is in delta. However, in accordance with a modification of our invention, the valves may be interposed between the motor windings when they are connected in delta, and each of the supply terminals may be connected to the junction of a pair of valves and a winding. Under such circumstances only one of the valves is conductive when current flows through a winding.

The novel features that we consider characteristic of our invention are set forth with particularity in the appended claims. The invention itself, however, both as to its organization and its method of operation, together with additional objects and advantages thereof, will be understood from the following description of a specific embodiment, when read in connection with the accompanying drawings, in which:

Fig. 5 is a circuit diagram of a further modification of our invention.

Figure 1:
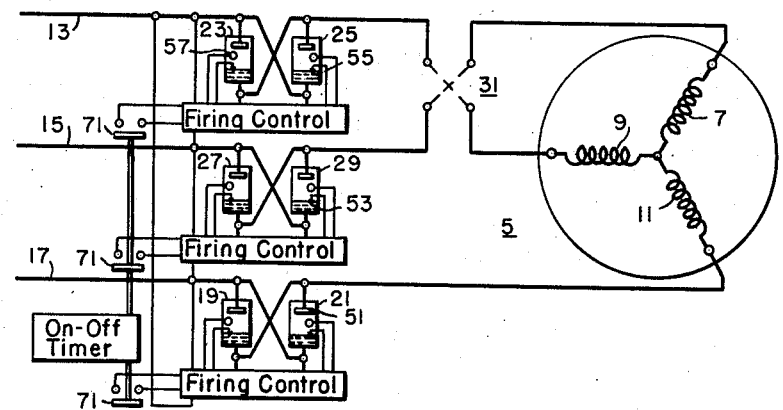
Figure 1 is a circuit diagram of an embodiment of our invention in which the motor is connected in star.

The apparatus shown in the drawing includes a three-phase motor 5 having three-phase windings 7, 9, 11 connected in star. Only the stator of the motor is shown.

The motor is supplied from three-phase commercial buses 13, 15 and 17 with power of the available commercial frequency (60 cycles per second in most sections of the U. S., 40 and 25 cycles per second in certain sections, and 50 cycles per second in European areas). One of the supply buses 17 is connected directly to a free terminal of a corresponding motor winding 11 through a pair of ignitrons 19 and 21 in antiparallel. The other buses 13 and 15 are connected respectively to free terminals of the other windings 7 and 9 each through a pair of ignitrons 23 and 25 and 27 and 29 in antiparallel and contacts of a reversing contactor or a reversing switch 31.

Figure 2:
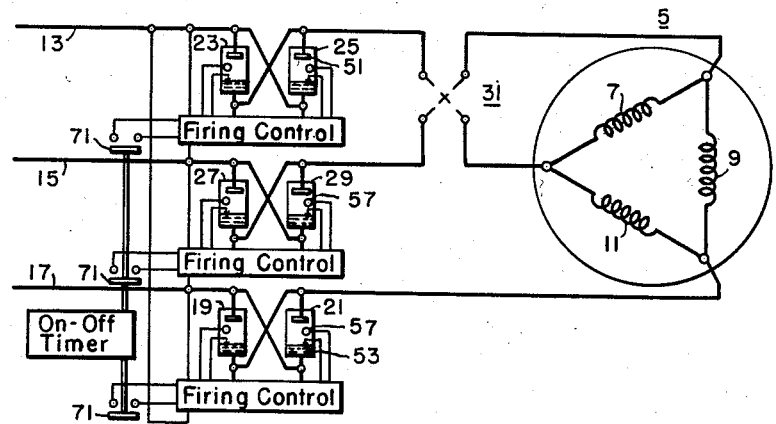
Fig. 2 is a circuit diagram of a modification of our invention in which the motor is connected in a polygonal configuration.

The motor 5 of the system shown in Fig. 2 is adapted to be connected in delta. The necessity for such connection may arise in situations in which the press mechanism to which the motor is connected sticks. This system is supplied in the same manner as Fig. 1 system is supplied through ignitrons 19, 21, 23, 25 and 27 in antiparallel and reversing contactors 31 between two pairs of the ignitrons and two terminals of the motor. The system shown in Fig. 1 may be converted into the system shown in Fig. 2 by rearranging the connections of the motor windings 7, 9 and 11.

Figure 3:
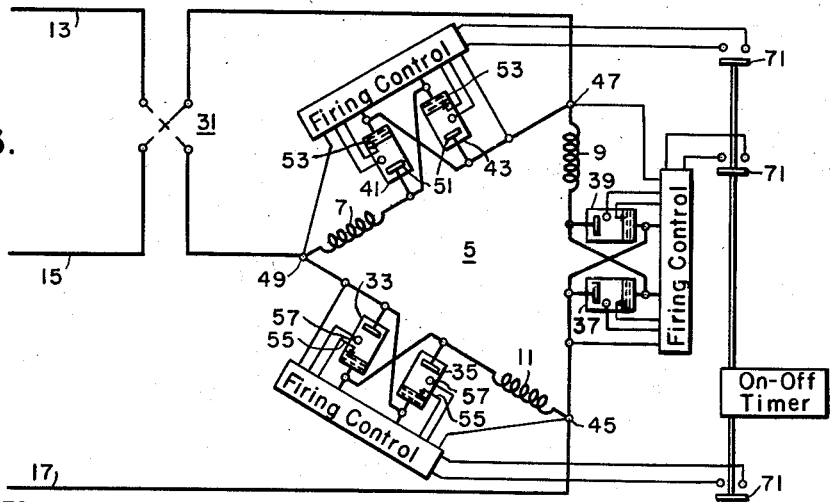
Fig. 3 is another modification of our invention in which the motor is connected in a polygonal configuration.

Another system is shown in Fig. 3. In this system the motor windings 7, 9 and 11 are connected in delta through pairs of antiparallel connected ignitrons 33 and 35, 37 and 39 and 41 and 43 respectively. The junction 45 of one of the windings 11 and a pair of antiparallel connected ignitrons 37 and 39 is connected directly to a phase terminal 17 of the supply. The other junctions 47 and 49 are connected to the phase terminals 13 and 15 through reversing contactors 31.

Figure 4:
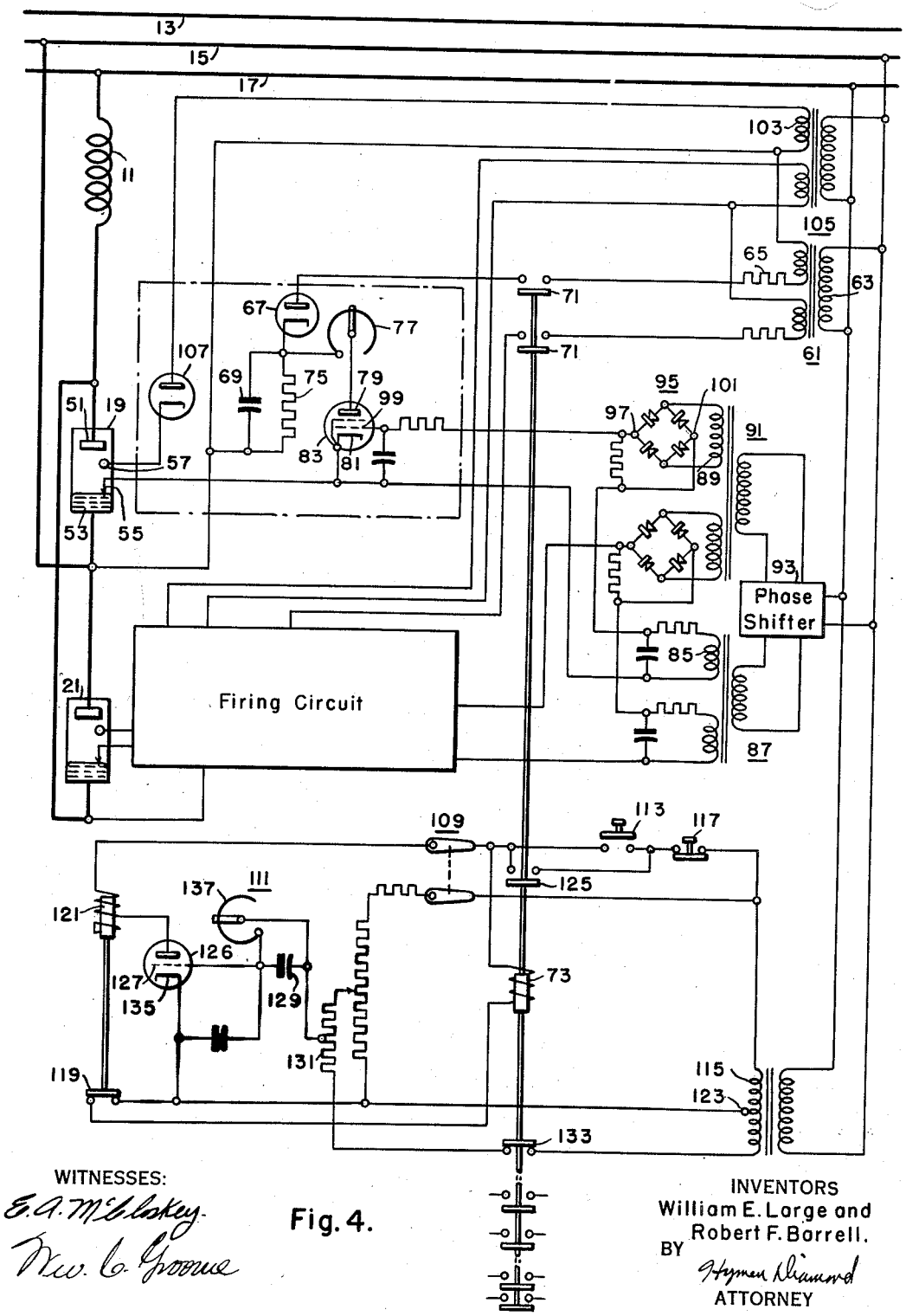
Fig. 4 is a circuit diagram of an embodiment of our invention showing in detail the control system for the electric discharge valves.

The ignitrons in circuit with the motor windings are alike, each being provided with an anode 51, a cathode 53, an igniter 55, and an auxiliary anode 57. Firing current is supplied to each of the igniters independently of the anode potential. The supply of the firing current is timed in accordance with the manner in which the motor windings are connected. The firing and timing system is shown in Fig. 4 for one of the ignitrons 19. Similar firing and timing systems are provided for the other ignitrons.

The firing circuit for each pair of antiparallel connected ignitrons includes a transformer 61, primary 63 of which is supplied from the buses (in the case of ignitrons 19 and 21 the buses 15 and 17) from which the associated ignitrons derive their anode potential. Across one secondary 65 of this transformer, a rectifier 67 and a capacitor 69 may be connected in series through the contact 71 of a starting relay 73 when the latter is actuated. The capacitor is accordingly charged from this secondary when the contact 71 is closed. The secondary 65 is so connected that the anode potential supplied to the rectifier 67 is in opposite phase to the anode potential supplied to the associated ignitron 19. With the contact 71 closed, the capacitor 69 is accordingly charged while the anode potential of the associated ignitron 19 is negative. When the apparatus is not in operation any residual charge on the capacitor is dissipated in a resistor 75.

The capacitor is connected in a circuit including an inductance 77, the anode 79 and cathode 81 of a thyratron 83, the igniter 55 of the associated ignitron (19) and the associated cathode 53. The thyratron is ordinarily maintained non-conductive by bias supplied from the secondary 85 of a bias transformer 87. The bias is counteracted by potential derived from the secondary 89 of a second transformer 91. The primaries of the transformers 87 and 91 are supplied through a phase shifter 93 from the buses (15, 17) to which the associated ignitron (19) is connected. Across a secondary winding 89 of the counteracting transformer, a rectifier bridge 95 is connected. The negative output terminal 97 of this bridge is connected to the control electrode 99 of the thyratron 83 and the positive terminal 101 to the cathode 81. The bridge when energized from the transformer 91 supplies inverted half-waves in the control circuit of the thyratron 83. The maximum points of these half-waves occur at instants predetermined by the phase shifter 93. At these instants the thyratron 83 is fired conducting firing current through the igniter 55.

The wave form of the potential derived from the bridge 95 consists of a series of nodes or spikes joined by inverted loops. On this potential the sinusoidal potential of secondary 85 is superimposed. The wave form of the resulting potential consists of a series of alternate high nodes (occurring when the potential 85 is positive) and low nodes (occurring when the potential 85 is negative) joined by loops alternately dropping from a high node to a low one and rising from a low node to a high one. The thyratron 83 is fired when the total potential impressed on the grid 99 corresponds to a high node.

The anode 51 and cathode 53 of the ignitrons are connected in series with one or more windings (11 and 9 or 7) of the motor 5. When the motor is in operation, an inverse potential is impressed in the anode-cathode circuit of the ignitron 19. This inverse potential counteracts the supply potential (15, 17) and tends to reduce the anode-cathode potential of the ignitron (19). In addition, the power factor of the motor changes as it comes up to speed. Because of the changing motor power factor and because of the inverse potential supplied by the motor 5, the anode potential of an ignitron (19) may be insufficient for firing at the instant when the firing capacitor 69 is discharged through the igniter 55. To assure that the ignitron will fire when it reaches the proper anode potential, an auxiliary firing circuit is provided. This circuit includes the secondary 103 of another transformer 105 supplied from the buses (15, 17) from which the ignitron (19) is supplied, a rectifier 107 and the auxiliary anode 57 of the ignitron (19). Since this circuit is independent of the motor 5, the auxiliary anode potential is independent of the motor power factor. The auxiliary arc is accordingly fired at the instant when the firing capacitor 69 is discharged through the igniter 55. This auxiliary arc maintains a cathode spot in the ignitron (19), and when the main anode potential reaches the proper magnitude, a main arc is initiated at this spot between the main anode 51 and the cathode 53.

The operation of the firing circuits is controlled from the starting relay 73. Depending upon a setting of the selector switch 109, the exciting coil of this starting relay 73 is energized directly or from an on-off timer 111. When the motor windings 7, 9, 11 are connected in star the selector switch 109 is open.

When the selector switch 109 is open, the exciting coil is supplied directly. Under such circumstances the operation of the motor 5 may be initiated by the closing of a push button 113. Current then flows from a terminal of a secondary 115 through a stopping push button 117, the starting push button 113, the exciting coil of the relay 73, a now closed contact 119 of a time delay relay 121 to an intermediate tap 123 of the secondary 115. The relay 73 is actuated and locked in through one of its auxiliary contacts 125 and its contacts 71 in the starting firing capacitor circuits are closed. The firing capacitor 69 of each circuit is in its turn now repeatedly charged and discharged through the associated igniter 55, and the associated ignitrons 19 to 29 and 33 to 43 are fired at instants predetermined by settings of the phase shifter 93. Three-phase current is supplied to the motor windings 7, 9 and 11. With the motor connected as shown in Fig. 1, two of the ignitrons are conductive at all times during the interval during which the motor is supplied.

Let us assume, for example, that the reversing contactor 31 is connected so that the upper phase bus 13 is connected to the upper winding 7 of the motor and the central phase bus 15 to the central winding 9 of the motor, and that ignitrons 23 and 29 in these two phase buses are rendered conductive. Under such circumstances, current flows from the upper phase bus 13 through the associated conductive ignitron 23, the contactor 31, the upper winding 7 of the motor 5, the central winding 9 of the motor, the conductive ignitron 29 to the central phase bus 15. The current conducted through the windings 7 and 9 rises and decreases and eventually one of the lower ignitrons 21 is rendered conductive. Because of the inductive reactive potential impressed by the motor windings 7 and 9 which are conducting current the ignitrons 23 and 29 are still conductive when the ignitron 21 is rendered conductive. This reactive potential is particularly effective when the power factor of the motor is decreasing and the ignitrons are fired at instants, in the periods of the supply corresponding to the highest power factor angle. When the ignitron 21 is rendered conductive current flows from the upper phase bus through the ignitron 23 associated with it which is still conductive, the reversing contactor 31, the upper motor winding 7, the lower motor winding 11, the newly conductive ignitron 21 to the lower phase bus 17. The ignitron 29 connected to the central bus 15 is now immediately extinguished. After the current through windings 7 and 11 has increased and decreased, the other ignitron 27 connected to the central phase bus 15 becomes conductive. Under such circumstances current flows from the central bus 15 through the newly conductive ignitron 27, the contactor 31, the central motor winding 9 (in a direction reverse to the initial direction), down through the lower motor winding 11, the ignitron 21 which has been conductive to the lower bus 17. The ignitron 23 immediately becomes non-conductive. In time the other upper ignitron 25 becomes conductive. Current now flows from the central bus 15 through the ignitron 27 which has been conductive, the contactor 31 in the same direction through the central motor winding 9 up through the upper motor winding 7, the contactor 31, and the newly conductive ignitron 25 to the upper phase terminal 13. Ignitron 21 is then immediately extinguished. The remaining ignitron 19 is eventually rendered conductive. Current then flows from the lower phase terminal 17 through this newly conductive ignitron 19, up through the lower winding 11, up through the upper winding 7, the reversing contactor 31 and the upper conductive ignitron 25 to the upper phase terminal 13. Ignitron 27 is then immediately extinguished. Eventually the initially conductive central ignitron 29 is again rendered conductive. Current now flows from the lower phase terminal 17 through the conductive ignitron 19 up through the lower winding 11, in the initial direction through the central winding 9, the reversing contactor 31, the newly conductive ignitron 29 to the central phase terminal 15 and ignitron 25 is extinguished. Finally the initially conductive upper ignitron 23 is rendered conductive. Current then flows in the initial direction from the upper phase terminal 13 through the newly conductive ignitron 23 through the contactor 31 down through the upper motor winding 7, the central motor winding 9, the contactor 31, the conductive ignitron 29 to the central phase terminal 15. The above-described cycle is repeated continuously until the stopping button 117 is opened and the starting relay 73 drops out.

When the motor 5 is used to operate a press its direction of rotation must be occasionally reversed, particularly when the press assembly is being set up. For this purpose the reversing contactor 31 is actuated. This contactor may be operated by a push button (not shown) or by a switch mechanism (not shown) cooperative with the press, or in any other convenient manner.

When the press with its motor is being set up the motor is operated in a forward direction, then stopped suddenly and reversed. In considering this operation, let us assume that the motor 5 is to be actuated by the current flow described above to close the press. In this situation the contactor 31 is first closed, then the ignitrons are fired to rotate the motor in the forward direction. When the press has reached the desired position, the motor is to be reversed. Under these circumstances the firing of the ignitrons is discontinued and they cease to conduct. The reversing contact 31 is then operated. The ignitrons are then again fired. The current flow through the rotor of motor 5 is now reversed and the press is raised.

When the motor 5 is connected in delta, to release a sticking press, each of its windings (7, 9, 11) is connected across the supply terminals. To prevent overloading, the motor must now be supplied intermittently. The selector switch 109 is closed to accomplish this object. This switch brings into operation the timer circuit 111. This circuit includes a thyratron 126. The grid 127 of the thyratron is connected to the lower terminal of the secondary 115 through a timing capacitor 129, a portion of the windings of a rheostat 131, and an auxiliary contact 133 of the starting relay 73. The cathode 135 of the thyratron 126 is connected to the center tap 123 of the secondary 115. When the lower terminal of the secondary 115 is negative and the upper terminal positive, the timing capacitor 129 is charged through the cathode 135 and the grid 127 of the thyratron 126 to a potential such that a negative bias is impressed in the grid circuit. The thyratron 126 is, therefore, maintained non-conductive.

To carry out the operation of releasing the sticking press, the operator closes and holds closed button 113. When the starting button 113 is actuated, current flows through the exciting coil of the starting relay 73 and the latter is actuated. The auxiliary contact 133 in series with the timing capacitor 129 is now opened and the capacitor begins to discharge through a rheostat 137 in parallel with it. The capacitor 129 discharges for a predetermined time interval until its potential reaches a magnitude at which the thyratron 126 becomes conductive. During this interval the motor windings 7, 9, and 11 are supplied in the sequence described above. In the usual practice of our invention, the capacitor discharges to the firing potential in approximately 15 or 20 periods of the supply.

When the thyratron is rendered conductive, the time delay relay 121 picks up. This relay is of the type which picks up instantaneously when current is supplied thereto, but drops out only a predetermined time interval after the current flow thereto is interrupted. When the time delay relay 121 picks up, the circuit through the exciting coil of the starting relay 73 is opened at now open contact 119 and the starting relay drops out. The current flow through the motor windings 7, 9 and 11 is then interrupted.

When the starting relay 73 drops out, its auxiliary contact 133 is closed and bias is reimpressed in the control circuit of the thyratron 126. If button 113 remains closed, the thyratron is then again rendered non-conductive. A predetermined time interval after the thyratron becomes non-conductive the time delay relay picks up and in turn the starting relay 73 is actuated. The timing mechanism of the time delay relay is so set that the starting relay remains open for a time interval of the order of one or two seconds. Once the time delay relay 121 drops out and the starting relay 73 is actuated, current is again supplied to the motor for the time interval of 15 or 20 cycles. This operation is repeated as the motor continues to be actuated. The time intervals herein said to be 15 or 20 cycles and a second or two may be varied over a wide range in accordance with the requirements of the motor.

The apparatus shown in Fig. 3 is operated with the selector switch 109 closed. In this apparatus current is supplied to each winding in its turn as an associated ignitron 33 to 43 is rendered conductive.

The motor 5 may also be supplied either in Y or in delta from a three phase supply including only two pairs of antiparallel connected ignitrons. In such a system one supply terminal is directly connected to a motor terminal. A system of this type is shown in Fig. 5. In this view the buses 13 and 15 are connected to two motor terminals through antiparallel connected ignitron pairs 201 and 203 and 205 and 207. Bus 17 is connected directly to the remaining terminal.

While we have shown and described a certain specific embodiment of our invention, we are aware that many modifications thereof are possible. Our invention, therefore, is not to be restricted except as is necessitated by the prior art and by the spirit of the appended claims.

We claim as our invention:

1. In combination, a polyphase motor having a plurality of phase windings connected in star and a pair of conductors for supplying each winding, one conductor of each pair being connected to a winding of said motor and the other being adapted to be connected to a terminal of a power supply, a pair of ignitrons interposed in antiparallel between each pair of conductors and a circuit each for controlling the conductivity of each of said ignitrons, each said circuit including means for presetting the instants in the periods of the supply when the associated ignitron is rendered conductive.

2. In combination, a polyphase motor having a plurality of windings, each winding having a pair of terminals, conductors corresponding in number to the phases of said motor for connection to a power supply, a pair of ignitrons interposed in antiparallel between each of said conductors and one terminal of each of the windings of said motor, each of said ignitrons including an igniter and a cathode, means for interconnecting the remaining terminals of said windings, and a circuit each for controlling the conductivity of each of said ignitrons, each said circuit including means connected between the igniter and the cathode of its associated ignitron adapted to provide a source for firing said associated ignitron independently of the potential of the supply for said ignitron at a predetermined instant in the periods of said supply following the instant of zero potential by an angle substantially equal to the power factor angle for the highest power factor at which said motor operates.

3. In combination, a polyphase motor having a plurality of windings, each winding having a pair of terminals; said windings being adapted to be connected in star or in hypothetical electrical polygonal configuration; conductors corresponding in number to the phases of said motor for connection to a power supply; a pair of electric discharge valves interposed in antiparallel between each of said conductors and one terminal each of the windings of said motor; means for connecting the other terminals of each of said windings selectively either in star or in said hypothetical polygonal configuration; circuits for controlling the conductivity of said electric discharge valves; timing means associated with said circuits effective to actuate said circuits to render said valves conductive for predetermined time intervals and all non-conductive for intervening time intervals when said windings are connected in said polygonal configuration and effective to actuate said circuits to render said valves conductive continuously when said windings are connected in star, 4. In combination, a polyphase motor having a plurality of windings, each winding having a pair of terminals, conductors corresponding in number to the phases of said motor for connection to a power supply, a pair of ignitrons interposed in antiparallel between each of said conductors and one terminal of each of the windings of said motor, means for interconnecting the remaining terminals of said windings, and circuits for controlling the conductivity of said ignitrons, a circuit each being associated with each said ignitron and each said circuit including means adapted to provide a source for firing its associated ignitron independently of the potential of the supply for said ignitron at a predetermined instant in the periods of said supply.

5. In combination, a polyphase motor having a plurality of windings, each winding having a pair of terminals, conductors corresponding in number to the phases of said motor for connection to an alternating-current power supply, a pair of electric discharge valves interposed in antiparallel between each of said conductors and one terminal of each of the windings of said motor, connections between the remaining terminals of said windings, and a circuit each for controlling the conductivity of each said electric discharge valve, each said circuit including means for presetting the instants in the periods of said supply when the associated valves are rendered conductive.

6. In combination, a three-phase motor having three phase windings, each winding having a pair of terminals, means for connecting a terminal of a first of said windings to a terminal of a second of said windings, means for connecting the other terminal of said second winding to a terminal of a third of said windings and means for connecting the other terminal of said third winding to the remaining terminal of said first winding, at least one of said means including a pair of electric discharge valves connected in antiparallel between the terminals of said windings involved.

7. In combination a polyphase motor having a plurality of phase windings, each winding having a pair of terminals, a pair of electric discharge valves associated with each winding, means for connecting each of said pairs in antiparallel to a terminal of its associated winding; means for connecting said windings and their associated valves in a closed series network, and circuits for controlling the conductivity of said valves.

8. In combination, a polyphase motor having a plurality of windings, each winding having a pair of terminals, conductors corresponding in number to the phases of said motor for connection to a power supply, a pair of ignitrons interposed in antiparallel between each of said conductors and one terminal of each of the windings of said motor, each said ignitron having an igniter, a cathode, a main anode, and an auxiliary anode, means for interconnecting the remaining terminals of said windings, a main control circuit each for controlling the conductivity of each of said ignitrons, each said main circuit including means connected between the igniter and cathode of the associated ignitron adapted to provide a source for firing its associated ignitron independently of the potential of said supply at a predetermined instant in the periods of said supply by impressing between said igniter and cathode a potential of short duration compared to a period of said supply, and an auxiliary control circuit for each said ignitron including the auxiliary anode and the cathode of the corresponding ignitron, for providing an auxiliary arc in said ignitron to assure instantaneous firing thereof when the firing impulse is impressed in spite of the fact that the anode voltage on said ignitron may be insufficient for firing, said auxiliary circuit being independent of the associated motor winding.

9. In combination, a polyphase motor having a plurality of windings, each winding having a pair of terminals, conductors corresponding in number to the phases of said motor for connection to a power supply, a pair of ignitrons interposed in antiparallel between each of said conductors and one terminal of each of the windings of said motor, each ignitron including an igniter, a cathode, a main anode, and an auxiliary anode, means for interconnecting the remaining terminals of said windings, a first circuit each for controlling the conductivity of each of said ignitrons, each said first circuit including means connected between the igniter and the cathode of the associated ignitron adapted to provide a source for firing the associated ignitron independently of the potential of the supply for said ignitron at a predetermined instant in the periods of said supply following the instant of zero potential by an angle substantially equal to the power factor angle for the highest power factor at which said motor operates, said source impressing a potential short compared to a period of said supply between said igniter and cathode to produce said firing, and a second circuit each, connected to the auxiliary anode and to the cathode of each said ignitron and to said first circuit, independently of the motor winding to which the associated ignitron is connected, for firing an auxiliary arc on the application of a firing impulse in the event the potential impressed on said main anode is, at the instant when said firing impulse is applied, insufficient to fire the main arc.

References Cited in the file of this patent

UNITED STATES PATENTS

| | | |
|---|---|---|
| 1,069,661 | Carman | Aug. 5, 1913 |
| 1,330,589 | James | Feb. 10, 1920 |
| 1,376,453 | Meyer | May 3, 1921 |
| 1,723,857 | Hobart | Aug. 6, 1929 |
| 2,250,961 | Livingston | July 29, 1941 |
| 2,261,144 | Dawson | Nov. 4, 1941 |
| 2,298,210 | Gulliksen | Oct. 6, 1942 |
| 2,320,491 | Vedder et al. | June 1, 1943 |
| 2,396,294 | Spenser | Mar. 16, 1946 |
| 2,424,104 | Lord | June 15, 1947 |
| 2,444,186 | Elliot | June 29, 1948 |
| 2,535,499 | Lexa | Dec. 26, 1950 |

FOREIGN PATENTS

| | | |
|---|---|---|
| 389,459 | Great Britain | Mar. 6, 1933 |